July 4, 1933.    J. G. ZIMMERMAN    1,916,709
DRY BATTERY
Filed Oct. 1, 1927    2 Sheets-Sheet 1
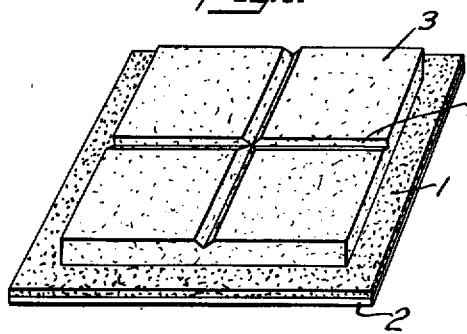
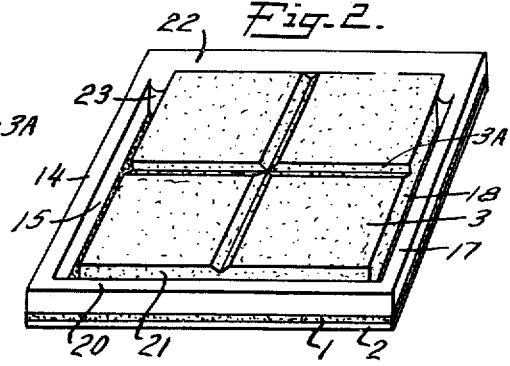
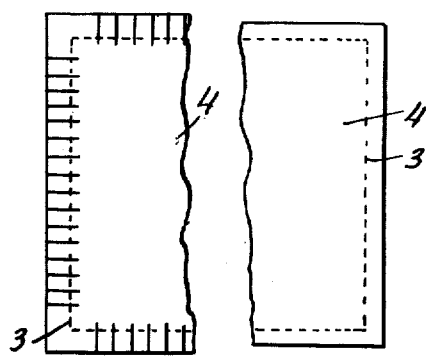
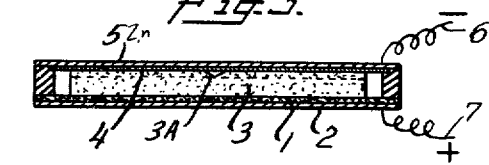
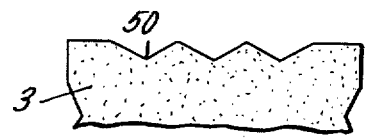
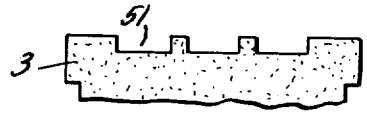
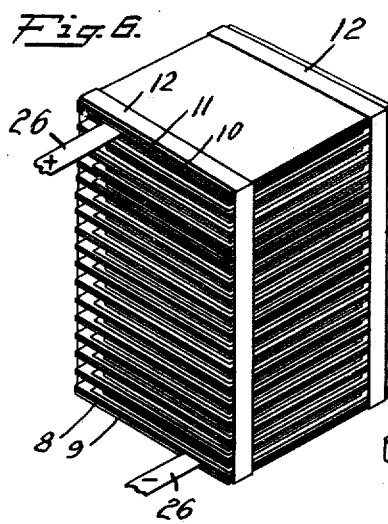
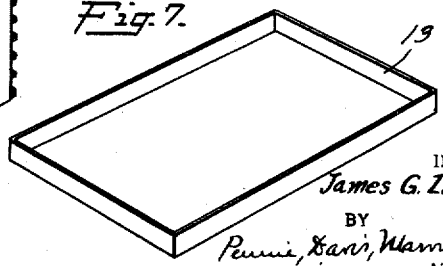
INVENTOR
James G. Zimmerman
BY
Pennie, Davis, Marvin & Edmonds
ATTORNEYS July 4, 1933.  J. G. ZIMMERMAN  1,916,709
DRY BATTERY
Filed Oct. 1, 1927    2 Sheets-Sheet 2
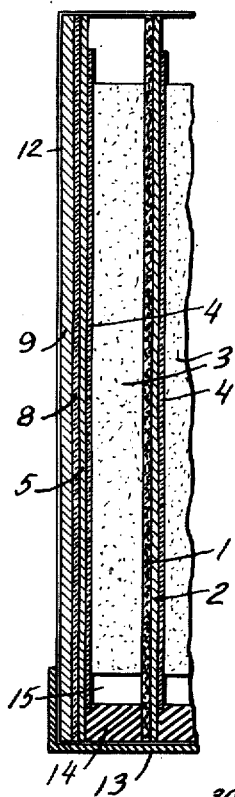
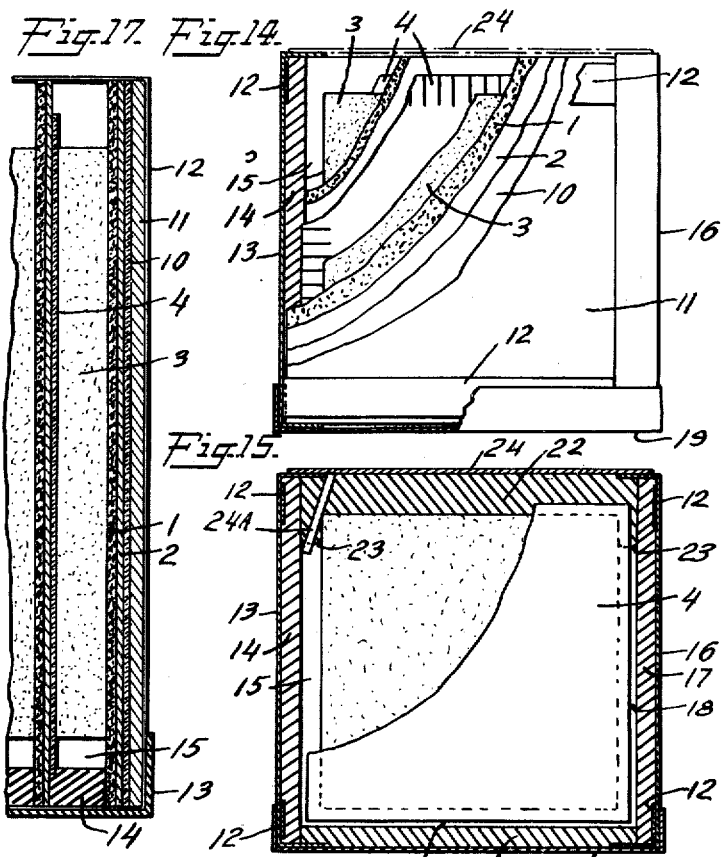
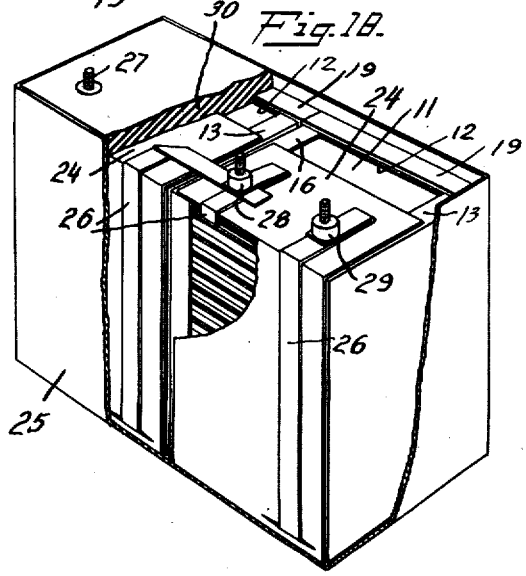
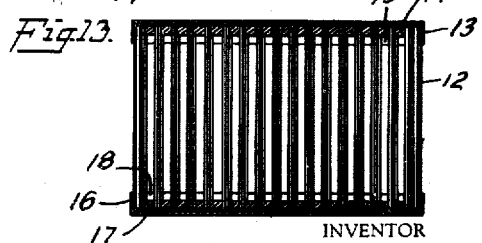
INVENTOR
James G. Zimmerman
BY
Pennie, Davis, Marvin & Edmonds
ATTORNEYS Patented July 4, 1933

1,916,709

UNITED STATES PATENT OFFICE

JAMES GARFIELD ZIMMERMAN, OF MADISON, WISCONSIN, ASSIGNOR, BY MESNE ASSIGNMENTS, TO BURGESS BATTERY CO., OF MADISON, WISCONSIN, A CORPORATION OF WISCONSIN

DRY BATTERY

Application filed October 1, 1927. Serial No. 223,341.

This invention relates to a dry battery made of flat cells. It relates especially to the expansion space of the individual cell and the method of assembling the battery to form the expansion space.

It is an object of my invention to form an expansion space in a dry cell of the flat type which will be ample in size, which will be so placed that it will not cause any blowing of the seal or leaking of the electrolyte, and which will be readily formed without interferring with the assembly operation. A further object is to provide a method of assembling a dry battery consisting of one or more flat cells in parallel spaced relation, which will give a positive seal between the individual cells, which seal will be free from bubbles and will form an expansion space having the properties previously described. Further objects will become apparent in the specification and drawings in which:

Fig. 1 is a perspective view of a mix cake mounted on a composite electrode;

Fig. 2 is a similar view showing the sealing material in place and the arrangement of the expansion spaces;

Fig. 3 is a cross section of a complete cell;

Fig. 4 is a plan view of one form of bibulous liner;

Fig. 5 is a similar view of another form of liner;

Fig. 6 is a perspective view of an assembled unit of flat cells prior to sealing;

Fig. 7 is a perspective view of a tray used in my improved method of sealing;

Fig. 8 is an illustration of one form of mix cake;

Fig. 9 is a similar view showing a modification;

Fig. 10 is a similar view showing another modification;

Fig. 11 is a similar view showing another modification;

Fig. 12 is a cross section of the entire battery unit after the first side has been sealed;

Fig. 13 is a similar view after the second side has been sealed;

Fig. 14 is a cross section at right angles to Figs. 12 and 13 showing the battery after the third side has been sealed;

Fig. 15 is a view similar to Fig. 14 showing the battery after the fourth side has been sealed;

Fig. 16 is an enlarged cross section of the negative end of the battery after the first side has been sealed;

Fig. 17 is a similar view of the positive end of the battery, and

Fig. 18 is a perspective view of the finished battery.

An individual cell in a battery of flat dry cells made in accordance with my invention may consist of a flat carbonaceous conductive cathode 1 which may be a flat carbon or graphite plate impregnated with a suitable moisture repellant such as paraffin or it may be a conductive plastic ribbon consisting of powdered carbon or graphite mixed with a suitable binder such as paraffin, beeswax, rosin, varnish, or combinations of these and other materials such as oils. A suitable mixture consists of 60% powdered graphite, 30% rosin, 5% linseed oil and 5% paraffin. This conductive plastic may be squirted or rolled into the form of a ribbon and used as such but it is preferably rolled onto a sheet of zinc or other anode metal 2 to form a unitary structure as shown in Figs. 1 to 3. In this unitary electrode the impervious plastic carbonaceous coating forms the cathode of one cell and the zinc forms the anode of the adjacent cell. If the plastic is rolled into sheet or ribbon form it is placed onto the zinc sheet to effect the same result as when the plastic is rolled directly onto the zinc. Any other sheet metal, such as steel, may be used in place of the zinc for the composite unitary electrode forming the positive pole of the positive end cell of a battery unit of flat dry cells.

A flat molded mix cake 3 is placed onto the cathode 1. This mix cake may have a flat surface or may contain grooves or channels 3A as will be hereinafter explained. The mix cake comprises a conductive depolarizing mixture of powdered graphite or carbon, a depolarizer such as manganese dioxide, sal ammoniac, zinc chloride and water which is well known to those skilled in the art. A bibulous partition 4 of paper pulp, blotting paper or the like contacts with the mix cake. A sheet zinc anode 5 contacts with the bibulous liner. The bibulous liner should be slightly smaller in area than the anode. If another cell is placed in series with zinc anode 5 a flat carbon cathode may be placed in contact with said anode. Preferably a composite unitary electrode of carbon coated zinc as previously described is used instead of the zinc anode 5 unless it is the negative end of the battery. A wire 6 or other metal lead is readily soldered to the uncoated zinc anode, said wire usually leading to one terminal post of the finished battery. A similar lead 7 may be attached to the composite positive terminal. In assembling a multiple plate battery the composite electrodes 1, 2, mix cakes 3, bibulous linings 4 are stacked in repeated succession until the desired number of cells are formed as shown in Fig. 6. As shown in Fig. 16 the last negative plate of the battery is preferably not a composite electrode. A layer of insulating paper 8 or other insulating material covers the negative zinc plate 5. A reenforcing plate 9 of stiff metal or wood covers the end. At the positive end, Fig. 17, a sheet of insulating material 10 and reenforcing plate 11 similarly covers the end composite electrode 1, 2.

The assembled pile is then put under some pressure to secure proper contact between the elements of the cells, thereby decreasing the contact resistance. While under pressure, the assembled pile is bound into a battery unit and kept under pressure by means of tapes 12 of paper or cloth as shown in Fig. 6. Rubber bands or other similar means may be employed for this purpose. This battery unit may be readily handled for the succeeding operations.

The pitching of the battery unit, whereby expansion spaces are formed, is carried out as follows. Shallow paper or other suitable trays 13, as illustrated in Fig. 7, preferably water proofed by paraffining, are filled with a suitable fusible sealing material such as a pitch. The trays are slightly larger than the extreme height and width of the taped battery unit. The battery unit is laid on its side, preferably one of the taped sides, in the tray containing the melted pitch so that the pitch 14 wells up between the composite electrodes as shown in Fig. 12. The quantity of fusible sealing material 14 which must be poured into the tray 13 must be carefully measured so that it will well up to the proper height on the uncovered portions of the electrodes 1 and 2. The sealing material 14 should not touch the mix 3 but should be high enough to give a sufficient expansion space 15. About $\frac{1}{18}''$ is sufficient for the purpose. This gives a large enough sealing or contact area between the pitch and the electrodes and prevents liquid from leaking to the outside surface of the battery. The bibulous partition 4 should overlap the mix 3 to prevent bridging of sal ammoniac or other conductive material from the mix 3 to the zinc 1 or 5. Preferably the sealing material should not quite touch the bibulous partition so that the expanding liquids generated between the zinc and partition may escape around the end of the partition into the expansion space 15. As it is difficult to exactly judge the depth of the sealing material in tray 13 to accomplish this result and since it is impossible to always line up the partitions exactly during the assembly operation, I have found that by slitting the edges of the partition 4 as shown in Fig. 4, the expanding liquids pass through the slits into the expansion space 15. The edges of the tray 13 should extend slightly higher than the height of the mix edge adjacent the sealing material. The battery is allowed to remain in the sealing material until it has set, after which it is ready for the second sealing operation.

Preferably the side of the battery unit opposite to that first sealed is set into a tray 16 of sealing material 17 as in the first instance and the sealing material allowed to set. Fig. 13 illustrates the result, expansion spaces being formed at 18. The trays, if of paper, are not removed as they form the inner carton of the assembled battery. A third side of the battery is similarly sealed with results shown in Fig. 14, with tray 19 overlapping trays 13 and 16. The sealing material 20 is spaced from the mix forming expansion space 21. The fourth side of the battery is now ready for sealing. The fusible sealing material is poured over the fourth side of the battery unit to completely fill the space above the exposed mix between the projecting portion of the electrodes as shown in Fig. 15. The trays 13 and 16 retain the sealing material 22 at the top, while the top opening of expansion spaces 18 and 15 are not sufficiently large to allow more than a few drops of the sluggish sealing material to run down at 23. If desired, the top seal which is relatively thick, may be reenforced with cheesecloth 24. A vent 24A may be inserted into the expansion space to relieve the gas pressure. The vent may be capillary glass tubing, carbon rod or other suitable material. The battery unit is now ready for assembling into larger units, or for the placing of terminals and final cartoning. As a result of the above pitching operations a section of the mix and sealing material of each cell has the appearance of Fig. 2. The mix 3 has expansion spaces 15, 18 and 21 immediately adjacent to three of its four edges with sealing material closures 14, 17 and 20 for said expansion spaces and a relatively thick sealing material immediately adjacent the fourth edge of said mix cake. Although I have described a battery in which expansion spaces are found on three sides of the mix cakes, such expansion spaces may be limited to one or two sides of the mix cake, the other sides being pitched in the usual manner.

After the battery units have been assembled and sealed as described they may be inserted into a labeled carton 25 of Fig. 18, the units usually being connected in series by connector 26 if used in "B" radio circuits requiring a high voltage. Terminals 27, 28 and 29 are provided and the entire battery finished with fusible seal 30 which anchors the terminals. Such batteries may consist of one or more cells depending upon the service required.

The edges of the mix cake may be indented or corrugated as shown in Figs. 8 to 11. By indenting the mix cake in this manner the depth of the sealing material in the tray 13 need not be regulated as closely as when a straight edged mix cake is formed. The indentations contain air which prevents the sealing material from entering the pocket, thus insuring an expansion space even if too much fusible sealing material is used. The edges of the mix cake may be of any desired configuration as illustrated at 50, 51, 52 and 53 of Figs. 8 to 11 respectively. The mix cake may have channels 3A of Fig. 1 in the surface contacting with the partition. These channels lead to the expansion space and allow the gases and expanding liquids to escape readily to the expansion space.

As stated the tapes 12 may be formed of paper, cloth or rubber bands, and throughout the claims this word is used in a broad sense.

I claim:

1. A dry battery comprising a plurality of flat electrodes in parallel spaced relation, each cell except the negative end cell in said battery comprising a composite flat zinc anode, a paper partition with slitted edges and slightly smaller than said anode and in contact therewith, a flat depolarizing mix cake slightly smaller in area than said partition and in contact therewith, a composite flat cathode in contact with said mix cake, an expansion space adjacent three of the four edges of said mix cake, a pitch seal closure for said expansion space, a tape encircling said battery holding said cell parts in intimate contact, paper trays adjacent the edges of said electrodes and on the three sides of said battery having expansion spaces, a relatively thick cheesecloth reenforced pitch seal on the fourth side of said battery, a casing for said battery, and a finishing seal for said casing with terminals projecting therethrough.

2. A dry battery comprising a plurality of flat electrodes in parallel spaced relation, each cell comprising a flat zinc anode, a paper partition slightly smaller than said anode and in contact therewith, a flat depolarizing mix cake slightly smaller in area than said partition and in contact therewith, a flat cathode in contact with said mix cake, an expansion space adjacent three of the four edges of said mix cake, a pitch seal closure for said expansion space, a tape encircling said battery holding said cell parts in intimate contact, paper trays adjacent the edges of said electrodes and on the three sides of said battery having expansion spaces, and a pitch seal on the fourth side of said battery.

3. A dry battery comprising a plurality of flat electrodes in parallel spaced relation, each cell in said battery comprising a flat zinc anode, a paper partition slightly smaller than said anode and in contact therewith, a flat depolarizing mix cake slightly smaller in area than said partition and in contact therewith, a flat cathode in contact with said mix cake, an expansion space adjacent three of the four edges of said mix cake, a fusible seal closure for said expansion space of said mix, means holding said cell parts in intimate contact, paper trays adjacent the edges of said electrodes and on the three sides of said battery having expansion spaces, and a relatively thick fusible seal on the fourth side of said battery.

4. A dry battery comprising flat electrodes in parallel spaced relation, each cell comprising a flat zinc anode, a paper partition slightly smaller than said anode and in contact therewith, a flat depolarizing mix cake slightly smaller in area than said partition and in contact therewith, a flat cathode in contact with said mix cake, each cell being provided with an expansion space adjacent three of the four edges of said mix cake the edge of the mix cake forming a wall of said expansible member, a fusible seal closure for said expansion space, a fusible seal adjacent the fourth edge of said mix and means holding said cell parts in intimate contact.

5. A dry cell comprising flat electrodes in parallel spaced relation and a depolarizing mix between the electrodes and having an expansion space adjacent the outer edge of the depolarizing mix, said mix having indented edges the edge of the mix cake forming a wall of said expansion chamber.

6. A dry battery comprising flat electrodes in parallel spaced relation, a depolarizing mix between the electrodes and having an expansion space adjacent the outer edge of the depolarizing mix, and a bibulous partition between the anode and depolarizing mix, said bibulous partition having slitted edges to permit the escape of expanding liquids generated between said anode and said bibulous partition.

7. A dry battery comprising flat electrodes in parallel spaced relation, a depolarizing mix between the electrodes, and a bibulous partition between the anode and the depolarizing mix, the depolarizing mix having an expansion channel in its surface contacting with the bibulous partition, each cell having an expansion space adjacent the edge of said mix cake, said channel connecting with said expansion space the edge of the mix cake forming a wall of said expansion space.

8. The method of assembling a flat dry cell battery which comprises stacking the component parts of the cell in parallel spaced relation, pressing and taping said cell into a unit while under pressure, immersing the electrode edges of one side of said unit in melted sealing pitch contained in a paper tray to seal said edges to a uniform height slightly below the exposed edges of the depolarizing mix cake to leave an expansion space between said pitch and said mix cake, allowing said pitch to set, likewise immersing the two adjacent sides in sealing pitch contained in paper trays to form expansion spaces adjacent the mix cake, pouring sealing pitch over the fourth side of said unit to completely cover the exposed side of said mix cake and projecting electrodes of said fourth side, allowing said pitch to set, putting said pitched battery into a carton and sealing said carton.

9. The method of assembling a flat dry cell battery which comprises stacking the component parts of the cell in parallel spaced relation, assembling said cell into a unit, immersing the electrode edges of at least one side of said unit in melted sealing material contained in a tray to seal said edges to a uniform height slightly below the exposed edge of the depolarizing mix cake to leave an expansion space between said sealing material and said mix cake, allowing said sealing material to set, and pouring sealing material over the unpitched sides of said unit to completely cover the exposed sides of said mix cakes and projecting electrodes.

10. The steps in the method of assembling a flat dry cell which comprise immersing the electrode edges of a side of the assembled cell in melted sealing material contained in a tray to a uniform height slightly below the exposed edge of the depolarizing mix, allowing said pitch to set, likewise immersing the two adjacent sides in sealing material contained in trays and allowing said seal to set.

11. The method of assembling a flat dry cell which comprises stacking the electrodes and a depolarizing mix cake in parallel spaced relation, the mix cake being of smaller area than the electrodes, and then immersing the electrode edges of a side of the assembled cell in melted sealing material contained in a tray to a uniform height slightly below the exposed edge of the depolarizing mix cake and allowing said pitch to set while said cell is so immersed.

In testimony whereof I affix my signature.

JAMES GARFIELD ZIMMERMAN.

---

CERTIFICATE OF CORRECTION.

Patent No. 1,916,709.                  July 4, 1933.

JAMES GARFIELD ZIMMERMAN.

It is hereby certified that error appears in the printed specification of the above numbered patent requiring correction as follows: Page 3, line 106, claim 4, for "expansible member" read "expansion chamber"; and that the said Letters Patent should be read with this correction therein that the same may conform to the record of the case in the Patent Office.

Signed and sealed this 15th day of August, A. D. 1933.

M. J. Moore.

(Seal)                              Acting Commissioner of Patents.

partition between the anode and the depolarizing mix, the depolarizing mix having an expansion channel in its surface contacting with the bibulous partition, each cell having an expansion space adjacent the edge of said mix cake, said channel connecting with said expansion space the edge of the mix cake forming a wall of said expansion space.

8. The method of assembling a flat dry cell battery which comprises stacking the component parts of the cell in parallel spaced relation, pressing and taping said cell into a unit while under pressure, immersing the electrode edges of one side of said unit in melted sealing pitch contained in a paper tray to seal said edges to a uniform height slightly below the exposed edges of the depolarizing mix cake to leave an expansion space between said pitch and said mix cake, allowing said pitch to set, likewise immersing the two adjacent sides in sealing pitch contained in paper trays to form expansion spaces adjacent the mix cake, pouring sealing pitch over the fourth side of said unit to completely cover the exposed side of said mix cake and projecting electrodes of said fourth side, allowing said pitch to set, putting said pitched battery into a carton and sealing said carton.

9. The method of assembling a flat dry cell battery which comprises stacking the component parts of the cell in parallel spaced relation, assembling said cell into a unit, immersing the electrode edges of at least one side of said unit in melted sealing material contained in a tray to seal said edges to a uniform height slightly below the exposed edge of the depolarizing mix cake to leave an expansion space between said sealing material and said mix cake, allowing said sealing material to set, and pouring sealing material over the unpitched sides of said unit to completely cover the exposed sides of said mix cakes and projecting electrodes.

10. The steps in the method of assembling a flat dry cell which comprise immersing the electrode edges of a side of the assembled cell in melted sealing material contained in a tray to a uniform height slightly below the exposed edge of the depolarizing mix, allowing said pitch to set, likewise immersing the two adjacent sides in sealing material contained in trays and allowing said seal to set.

11. The method of assembling a flat dry cell which comprises stacking the electrodes and a depolarizing mix cake in parallel spaced relation, the mix cake being of smaller area than the electrodes, and then immersing the electrode edges of a side of the assembled cell in melted sealing material contained in a tray to a uniform height slightly below the exposed edge of the depolarizing mix cake and allowing said pitch to set while said cell is so immersed.

In testimony whereof I affix my signature.

JAMES GARFIELD ZIMMERMAN.

CERTIFICATE OF CORRECTION.

Patent No. 1,916,709.

July 4, 1933.

JAMES GARFIELD ZIMMERMAN.

It is hereby certified that error appears in the printed specification of the above numbered patent requiring correction as follows: Page 3, line 106, claim 4, for "expansible member" read "expansion chamber"; and that the said Letters Patent should be read with this correction therein that the same may conform to the record of the case in the Patent Office.

Signed and sealed this 15th day of August, A. D. 1933.

M. J. Moore.

(Seal)

Acting Commissioner of Patents.

CERTIFICATE OF CORRECTION.

Patent No. 1,916,709. July 4, 1933.

JAMES GARFIELD ZIMMERMAN.

It is hereby certified that error appears in the printed specification of the above numbered patent requiring correction as follows: Page 3, line 106, claim 4, for "expansible member" read "expansion chamber"; and that the said Letters Patent should be read with this correction therein that the same may conform to the record of the case in the Patent Office.

Signed and sealed this 15th day of August, A. D. 1933.

M. J. Moore.

(Seal) Acting Commissioner of Patents.